R. B. DASHIELL.
TURRET.
No. 11,531. Reissued Apr. 14, 1896.
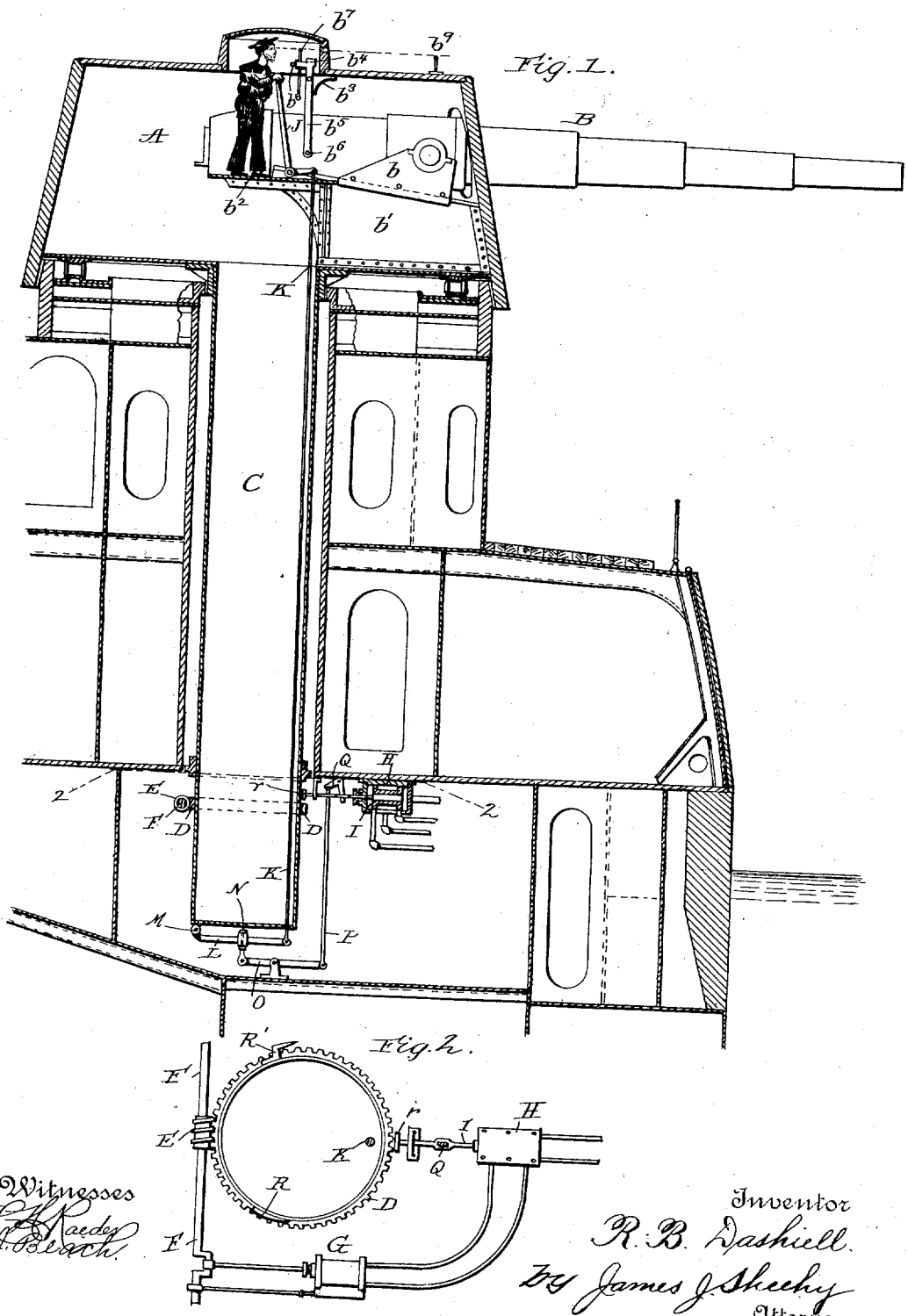
Witnesses
C. H. Raeder
V. J. Beach
Inventor
R. B. Dashiell.
By James J. Sheehy
Attorney
THE NORRIS PETERS CO., PHOTO-LITHO., WASHINGTON, D. C.

UNITED STATES PATENT OFFICE.

ROBERT B. DASHIELL, OF THE UNITED STATES NAVY.

TURRET.

SPECIFICATION forming part of Reissued Letters Patent No. 11,531, dated April 14, 1896.

Original No. 553,056, dated January 14, 1896. Application for reissue filed March 2, 1896. Serial No. 581,573.

*To all whom it may concern:*

Be it known that I, ROBERT B. DASHIELL, lieutenant, United States Navy, residing at Washington, in the District of Columbia, have invented certain new and useful Improvements in Turret-Vessels; and I do hereby declare that the following is a full, clear, and exact description of the invention, such as will enable others skilled in the art to which it appertains to make and use the same, reference being had to the accompanying drawings, and to the letters of reference marked thereon, which form a part of this specification.

My invention has reference to that class of war vessels in which the guns are mounted in revolving turrets, and more particularly to those vessels in which the turret is provided with a central downwardly-extending tube, affording communication from the interior of the turret to the interior of the ship, and serving also as a passage for the delivery of ammunition from the magazine to the turret-guns and as a means for effecting the rotation of the turret.

My invention has in view improved means for controlling from the turret or gun platform the operation of the engines which act to revolve the turret, to means for automatically arresting the rotation of the turret in the event of the gun-pointer being disabled or of neglecting to stop the engine at the proper time, and for means for properly sighting the turret-guns which recoil in lines which do not coincide with the line of fire.

In the drawings, Figure 1 represents a longitudinal vertical section through the center of the turret and the adjacent parts constructed in accordance with my invention. Fig. 2 is a horizontal section on the line 2 2 of the preceding figure, looking in a downward direction.

In the drawings, A represents an ordinary revolving turret carrying two guns, one of which, B, is shown. The turret rests, as usual, on a system of rollers, and is provided with a large central tube C, extending downward through the hull to the magazine. This tube is provided near its lower end with a worm ring or wheel D, engaged by a worm E, carried by a horizontal crank-shaft F, mounted in suitable fixed bearings and actuated by the engine G, which is supplied with the steam or other actuating fluid through a valve-chamber H. The foregoing parts may all be of the ordinary construction. This chamber contains the usual four-ported piston-valve I, or any equivalent form valve, the movement of which to and fro will cause the engine to revolve in reverse directions, while its adjustment to a central position will bring the engine and turret to a stop. To give the necessary motions to this valve with quickness and certainty, and with the turret in any position, is the object of the first part of my invention. To this end I pivot the angular hand-lever J to the gun-carriage or other support within the turret, and from its lower end extends a rod K downward through one side of the ammunition-tube to one end of a horizontal lever L, which passes diametrically across the bottom of the tube to a fulcrum M, fixed to the opposite side of the tube. To the middle of this lever, at a point coincident with the center of the ammunition-tube and turret, I connect by a swivel-bolt N or otherwise one end of a lever O, which is centrally pivoted to a fixed bearing. This lever O is in turn connected at its opposite end by a rod P to one end of a small angular lever Q, pivoted to the deck or other support and engaging the rod of the valve I. It will be observed that under this arrangement the movement of the lever J in the turret communicates movement instantly and positively to the engine-controlling valve, and that the rotation of the turret has no effect whatever upon the position or movement of the valve.

The essence of the invention lies in communicating motion from the controlling-lever or other device in the turret or other rotary gun-support to the stationary controlling-valve in the hull through connections coincident with the axis of rotation of the turret, and it will be obvious to the skilled mechanic that the form and arrangement of the details may be widely modified without departing from the limits of my invention.

I attach importance to the fact that the connection or upright rod has vertical movement only, as by such I attain great promptness of action and transmission of power or motion from the gunner's hand to the engine-valve, and overcome all stress and tension which necessarily results when long rods are used torsionally to manipulate the valve, it being well known to those skilled in mechanics that the time lost in twisting a long shaft becomes a serious element in a turret having a high deck far above the engine.

My invention has been practically applied and tested, and it is found that by its means the massive turret and its guns, greatly preponderating in weight on one side of the turret, may be turned rapidly and exactly notwithstanding the rolling of the vessel and other conditions encountered in practice, and that the guns may be aimed with the speed and precision not attainable by any other system now known.

It is obvious that if the turret is permitted to continue its revolution without interruption there would be danger of the protruding muzzles of the guns striking stanchions, the superstructure of the vessel, or other obstructions with serious result. To prevent any accident from this cause, in the event of carelessness of the attendant or of his being disabled, I propose to combine with the engines stop devices of any suitable character by which the action of the engine and the rotation of the turret will be automatically arrested whenever the turret has reached predetermined points in the course of its revolution in either direction.

In practice I have employed stop devices in the form represented in Fig. 2. The end of the valve-stem is provided with a head or enlargement $r$, and the turret-turning tube C, provided on one side with a fixed wedge R and on the opposite side with a forked plate R′, the under side of which is inclined or beveled. When the turret reaches the fixed limit of rotation to the left, the wedge R, moving with the rotary tube, is brought in contact with the end of the valve-stem and the valve pushed over to an intermediate position, bringing the engine and turret to a stop. When the turret is revolving in the reverse direction, the valve-stem is straddled by the plate R′ and the valve drawn outward to an intermediate or stopping position.

I believe myself to be the first to combine with a turret-turning engine automatic devices governed by the rotation of the turret and acting to control the engine.

As will be apparent to the skilled engineer, the form and arrangement of these stop devices may be variously modified without changing the principle of their action or passing beyond the field of my invention.

Passing now to the third feature of the invention—the sighting devices—attention is directed to Fig. 1, in which $b$ represents the gun-carriage, arranged to recoil up the inclined slide $b'$, fixed within the turret. Bolted to one cheek of the slide $b'$ is a small platform $b^2$, on which the gun-pointer stands. A vertical guide or slideway $b^3$ is bolted to the turret roof and head. In this guide a cross-head $b^4$ is fitted to slide vertically, the cross-head being in turn joined to one end of a bar or connecting-rod $b^5$, which is extended downward and connected to the body of the gun by a screw or stud $b^6$. The cross-head is fitted to receive the ordinary sight-bar $b^7$, which is fitted to slide vertically therein and secured by a screw $b^8$ or its equivalent.

The above-described combination forms the rear sight.

The front sight $b^9$, of any suitable form, is attached to the turret-roof, over the trunnions of the gun. When the gun is tipped on its trunnions to give it inclination, the cross-head carrying the sight-bar will slide upward and downward a corresponding distance, being actuated by the connecting-rod.

For the different angles of elevation the sight-bar is marked in accordance with the well-known methods of calculation.

To direct the gun at a target demanding an elevation of five degrees, the gun being in a forward or firing position, the sight-bar is raised by the gunner to the five-degree mark and fastened by the set-screw. Then the gun is elevated by the ordinary elevating-gear until the notch of the rear sight, the front sight, and the target are in line. The gun is now sighted at five degrees' elevation and on the target, as the vertical plane through the two sights is parallel to the vertical plane through the axis of the gun. When the gun recoils, the lower end of the link or connecting-rod will swing backward therewith. The only movement of the rear sight will be a slight vertical motion up and down, which is allowed for by the cross-head, when the counter recoil takes place, and the gun is in firing position, the sight is again ready for use.

It will be perceived that the sighting device is peculiarly applicable to the guns mounted, so that the line of fire and the line of recoil are divergent.

Having thus described my invention, what I claim is—

1. In combination with the gun-turret, its descending tube and the external engine acting through the tube to turn the turret, an engine-controlling device in the turret and a connection coincident with the axis of the turret and adapted to be actuated by the controlling device so that the vertical movement of said connection will control the engine.

2. In combination with the gun-turret, its descending tube and the external engine acting through the tube to turn the turret, an engine-controlling device in the turret, and a rod down the tube capable of vertical motion and connecting said controlling device with the valve-gear of the engine.

3. The gun-turret, its tube, and the external engine, in combination with connections from the engine to a fixed lever O, lying across the axial line of the tube, a second lever L carried by the tube, and also crossing its axial line, central connections between said levers, and a connection from the lever L to a manual device J in the turret.

4. In combination with the gun-turret, its descending tube and the external engine acting through the tube to turn the turret, the hand-lever J, rod K, and lever L, traveling with the turret and tube, a stationary lever O rod P, and connections from the latter to the engine-controlling valve, and a centrally-located connection N between the stationary and the traveling levers.

5. In combination with a gun-turret and an engine to rotate the same, engine-controlling devices arranged and actuated by the rotation of the turret to arrest the motion of the engine.

6. In combination with the gun-turret, its tube and an engine acting through said tube to rotate the turret, two engine-controlling stops fixed to the tube and arranged to act alternately on the engine-valve, substantially as described and shown.

In testimony whereof I hereunto set my hand this 27th day of February, 1896, in the presence of two attesting witnesses.

ROBERT B. DASHIELL.

Witnesses:

CHARLES H. RAEDER,
THOMAS E. TURPIN.